(12) United States Patent
Caldwell

(10) Patent No.: US 9,420,760 B2
(45) Date of Patent: Aug. 23, 2016

(54) COMPACT PET WASHING STATION

(71) Applicant: Russell L. Caldwell, Garden Prairie, IL (US)

(72) Inventor: Russell L. Caldwell, Garden Prairie, IL (US)

(73) Assignee: CCSI International, Inc., Garden Prairie, IL (US)

( * ) Notice: Subject to any disclaimer, the term of this patent is extended or adjusted under 35 U.S.C. 154(b) by 76 days.

(21) Appl. No.: 14/489,224

(22) Filed: Sep. 17, 2014

(65) Prior Publication Data

US 2015/0000610 A1    Jan. 1, 2015

Related U.S. Application Data

(60) Provisional application No. 61/971,620, filed on Mar. 28, 2014.

(51) Int. Cl.
*A01K 13/00* (2006.01)
*A47K 3/06* (2006.01)
*A47K 3/00* (2006.01)

(52) U.S. Cl.
CPC ............... *A01K 13/001* (2013.01); *A47K 3/001* (2013.01)

(58) Field of Classification Search
CPC ......... A01K 5/01; A01K 1/10; A01K 5/0107; A01K 5/0135; A01K 13/001; A01D 87/127; A47K 3/001; A47K 3/06; A47K 3/064
USPC ......... 119/673, 665, 671, 669, 675, 604, 667, 119/668, 674, 676; 4/587
See application file for complete search history.

(56) References Cited

U.S. PATENT DOCUMENTS

| | | | |
|---|---|---|---|
| 2,611,341 A | | 9/1952 | Paris |
| 2,950,484 A | * | 8/1960 | Jaffe ...................... A47K 3/064 229/117.07 |
| 3,583,368 A | | 6/1971 | Mandelhaum et al. |
| 4,332,217 A | | 6/1982 | Davis |
| 4,379,438 A | | 4/1983 | Peardon |
| 4,549,502 A | | 10/1985 | Namdari |
| 4,785,486 A | * | 11/1988 | Viesturs ................... A47K 3/06 4/585 |
| 4,987,619 A | | 1/1991 | Smith |
| 5,148,771 A | | 9/1992 | Schuett et al. |
| 5,630,379 A | * | 5/1997 | Gerk ..................... A01K 13/001 119/667 |
| 5,662,069 A | * | 9/1997 | Smith ................... A01K 13/001 119/665 |
| 5,738,044 A | * | 4/1998 | Gaylinn ............... A01K 13/001 119/665 |
| 5,794,570 A | | 8/1998 | Foster et al. |
| 5,931,174 A | | 8/1999 | Salas et al. |
| 5,974,601 A | * | 11/1999 | Drane ..................... A47K 3/001 4/539 |
| D493,259 S | * | 7/2004 | Itoiz Oroz ................... D30/158 |
| 6,988,467 B1 | * | 1/2006 | Smith ................... A01K 13/001 119/673 |
| 7,421,978 B2 | * | 9/2008 | Price ..................... A01K 13/001 119/604 |

(Continued)

*Primary Examiner* — Yvonne Abbott-Lewis
(74) *Attorney, Agent, or Firm* — Reinhart Boerner Van Deuren P.C.

(57) ABSTRACT

A compact self-service pet wash is provided. The compact self-service pet wash includes an equipment room, and a foldable wash tub. The equipment room has a depth that defines the storage depth of the pet wash. The equipment room provides the means to control and supply the wash tub with rinse water, wash solution mix and dry air to wash a pet in the wash tub.

21 Claims, 5 Drawing Sheets

(56) References Cited

U.S. PATENT DOCUMENTS

| | | | |
|---|---|---|---|
| 8,069,821 B1 * | 12/2011 | Green | A01K 13/001 119/671 |
| 8,186,308 B1 | 5/2012 | Hluben et al. | |
| 8,485,136 B2 | 7/2013 | Caldwell | |
| 8,689,740 B2 | 4/2014 | Caldwell | |
| 8,757,097 B1 * | 6/2014 | Autumn | A61D 11/00 119/665 |
| 2005/0034680 A1 | 2/2005 | Tunnell | |
| 2007/0039559 A1 * | 2/2007 | Foster | A01K 13/001 119/676 |
| 2007/0289548 A1 * | 12/2007 | Smoot | A01K 13/001 119/668 |

* cited by examiner

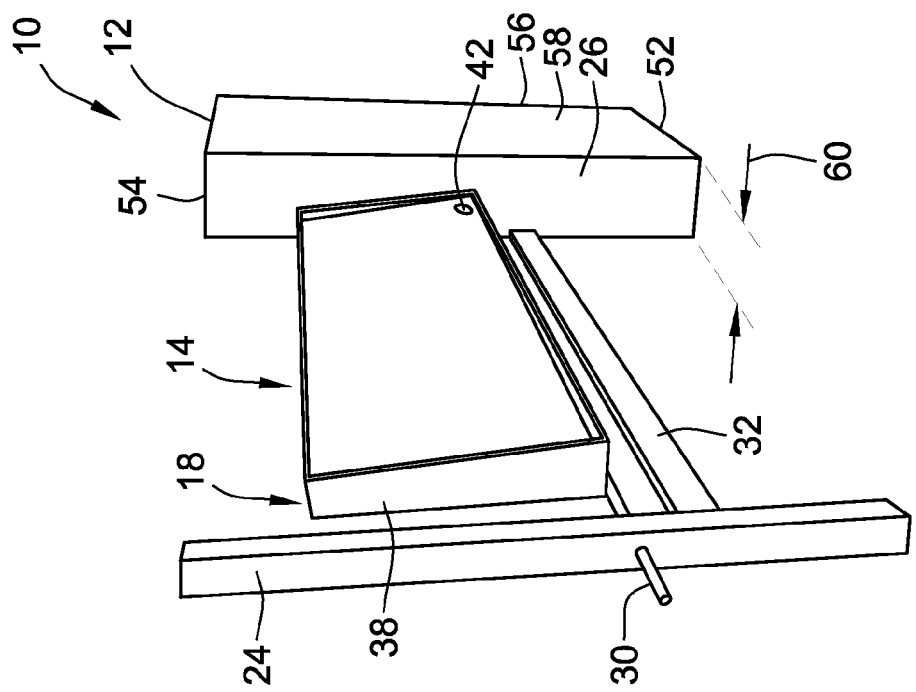
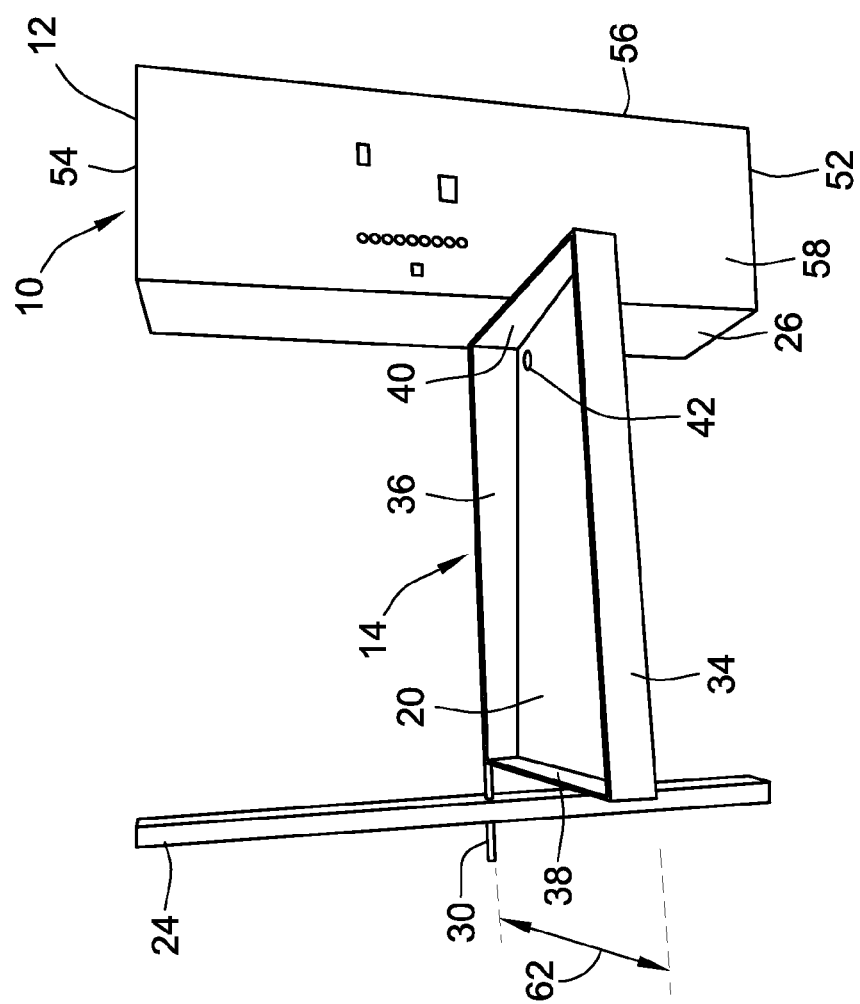

COMPACT PET WASHING STATION

CROSS-REFERENCE TO RELATED PATENT APPLICATIONS

This patent application claims the benefit of U.S. Provisional Patent Application No. 61/971,620, filed Mar. 28, 2014, the entire teachings and disclosure of which are incorporated herein by reference thereto.

FIELD OF THE INVENTION

This invention generally relates to a pet wash station, to enable a user to wash his or her pet.

BACKGROUND OF THE INVENTION

Self-service pet washing facilities are described in U.S. Pat. No. 8,485,136, the entire teachings of which are incorporated herein by reference. Often, self-service pet washing facilities are constructed as independent structures next to self-service car washing facilities, car wash facilities or like areas where grey water drains are in place together with a water supply and electrical supply. However, constructing the separate structure of a self-service pet wash may be costly for the owners. Additionally, often times the self-service car washes and like facilities are constructed so as to maximize the available real estate upon which they are built.

Therefore, although an owner of a facility may wish to install a self-service pet wash, she may not be able to do so because of the limited space available in the facility or on the property of the facility. For example, if a known self-service pet wash is installed in a bay of a self-service car wash then a vehicle is no longer able to fit into the bay occupied by the self-service pet wash.

Accordingly, the owner of a self-service car wash may not wish to dedicate an entire car wash bay to a self-service pet wash and lose the ability to use the bay to wash cars. Therefore, because of the limited available space and because of the cost associated with a pet wash that is independent of the existing facility, owners may be prevented from installing a separate self-service pet wash structure. Accordingly, there is a need for a low cost pet wash station that can be utilized in or near spaces that heretofore were too small to allow for a pet wash, for example, in the bay of a self-service car wash.

The invention provides such a pet wash station. These and other advantages of the invention, as well as additional inventive features, will be apparent from the description of the invention provided herein.

BRIEF SUMMARY OF THE INVENTION

In one aspect, the invention provides a compact self-service pet wash that includes an equipment room, a foldable wash tub having four sidewalls, a bridge member, a transverse bar, a round pivot bar, and a post. The equipment room has a depth that defines the storage depth of the pet wash. The equipment room provides the means to wash, rinse, and dry a pet in the wash tub.

In another aspect, the invention provides a compact self-service pet wash that includes an equipment room, a foldable wash tub having three side walls, a bridge member, a transverse bar, a round pivot bar, and a post. The equipment room has a depth that defines the storage depth of the pet wash. The equipment room provides the means to wash, rinse, and dry a pet in the wash tub.

In another aspect, the invention provides a compact self-service pet wash that includes an equipment room, a foldable wash tub having three side walls, and an entrance, a bridge member, a transverse bar, a round pivot bar, and a post. The equipment room has a depth that defines the storage depth of the pet wash. The equipment room provides the means to wash, rinse, and dry a pet in the wash tub.

In yet another aspect, the invention provides a compact self-service pet wash that includes an equipment room, a foldable wash tub having three side walls, an access to the wash tub, a foldable step to the access, a transverse bar, a round pivot bar, and a post. The equipment room has a depth that defines the storage depth of the pet wash. The equipment room provides the means to wash, rinse, and dry a pet in the wash tub.

In still another aspect, the invention provides a compact self-service pet wash that includes an equipment room, a fixed wash tub having four walls, the four walls comprise a front wall, back wall, and two side walls. The front wall has a cut out that defines an entry into the wash tub. A ramp or step provides a means for a pet to access the pet wash. The pet wash further includes a bridge member, a transverse bar, and a side panel. The equipment room has a depth that defines the storage depth of the pet wash. The equipment room provides the means to wash, rinse, and dry a pet in the wash tub.

Other aspects, objectives, and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 3 is a perspective view of other certain aspects of the pet wash station shown in FIG. 1;

FIG. 4 is a perspective view of yet other aspects of the pet wash station shown in FIG. 1;

While the invention will be described in connection with certain preferred embodiments, there is no intent to limit it to those embodiments. On the contrary, the intent is to cover all alternatives, modifications, and equivalents as included within the spirit, and scope of the invention as defined by the appended claims.

DETAILED DESCRIPTION OF THE INVENTION

Figure 1:
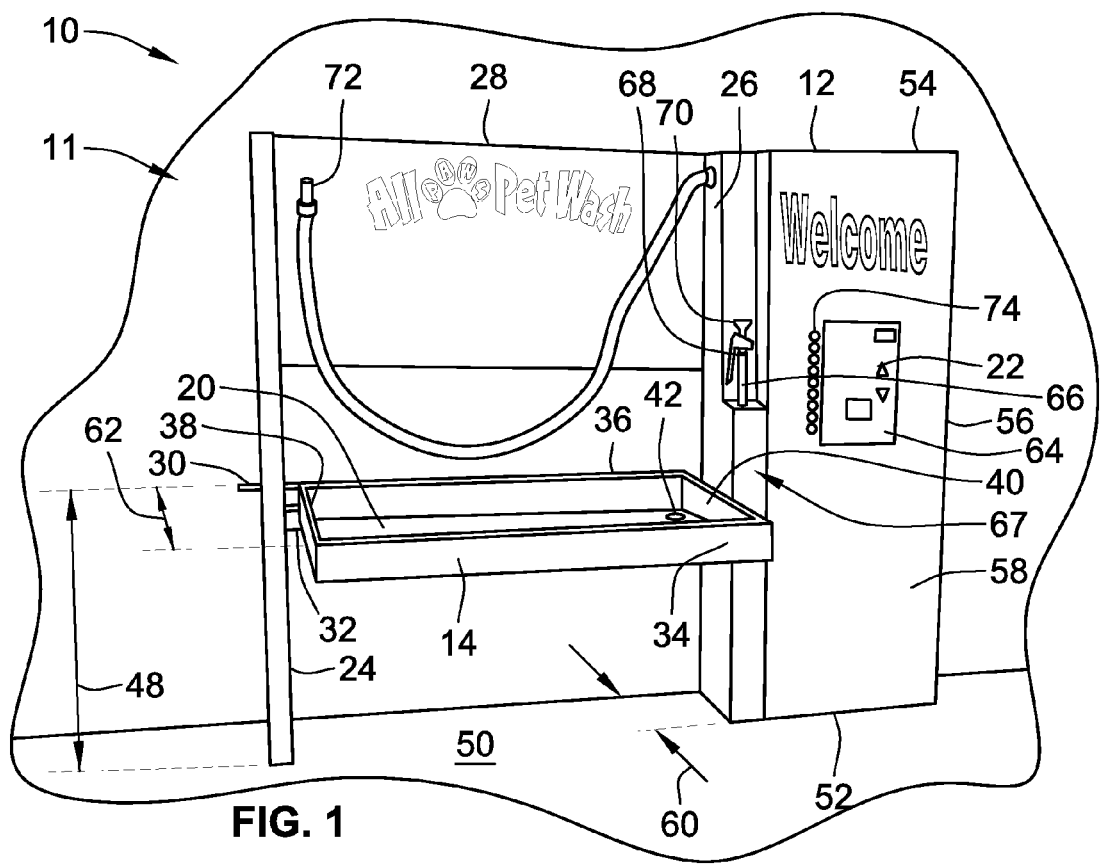
FIG. 1 is a perspective view of an embodiment of the present invention.
Figure 2:
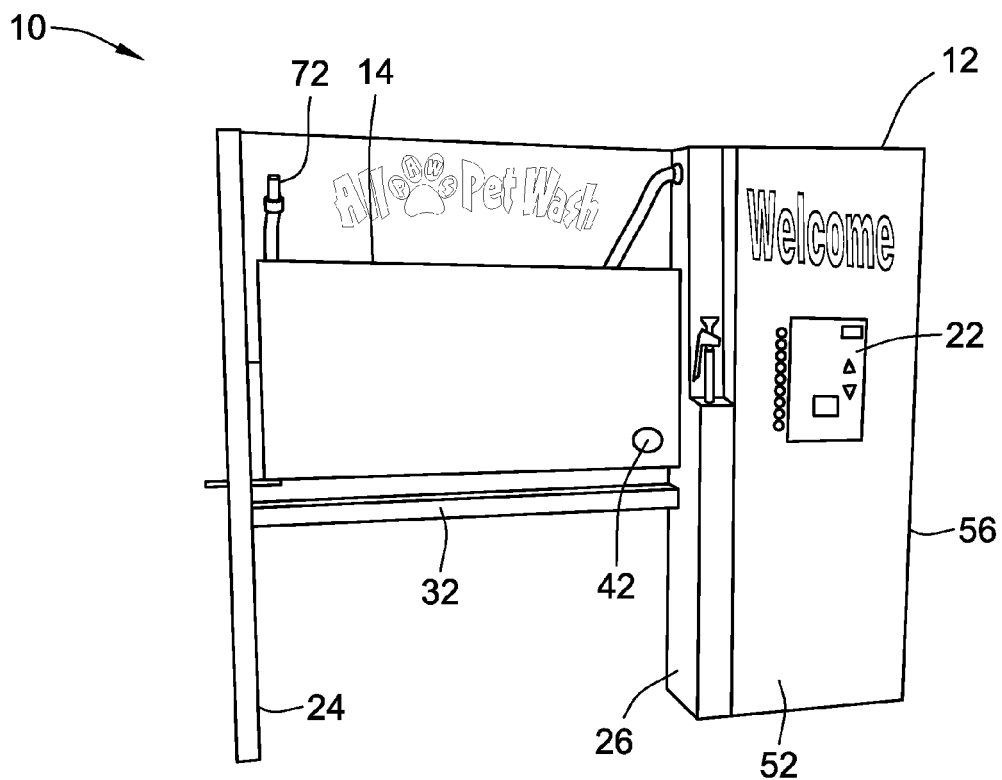
FIG. 2 is a perspective view of certain aspects of the pet wash station shown in FIG. 1.

FIGS. 1 and 2 illustrate an embodiment of a compact pet wash station 10 according to the invention. FIG. 1 illustrates the compact pet wash station 10 within a wash bay 11 of a car wash. The pet wash station 10 includes an equipment room 12 and a wash tub 14. The wash tub 14 is foldable between an open position FIG. 1 and a stored position (FIG. 2). The wash tub 14 provides a platform 20 for a pet to be placed upon so as to be manually washed. The washed pet may then be optionally dried with drying air. The equipment room 12 may provide the water, the wash solution mix and the drying air to the wash tub 14. The pressure and temperature of the water for the rinse and for the wash solution mix may be selectively controllable through a vending control unit 22 of the equipment room 12. The temperature and pressure of the drying air may be selectively controllable through the vending control unit 22.

A post 24 is spaced apart in opposed space relation from a surrounding side 26 of the equipment room 12. A bridge member 28, a round pivot bar 30, and a transverse bar 32 connect the equipment room 12 to the post 24. The bridge member 28, the round pivot bar 30, and the transverse bar 32 are spaced vertically apart from one another and in approximately parallel relation to one another to connect the equipment room 12 to post 24. The round pivot bar 30 mounts to the post 24 and a surrounding side wall 26 of the equipment room 12.

The wash tub 14 is comprised of a front wall 34, a back wall 36, and two side walls 38, 40 that surround platform 20. Platform 20 includes a drain 42 for the wash tub 14. A user would generally stand adjacent front wall 34 when washing a pet.

The round pivot bar 30 is rotatable about its axis so as to enable the wash tub 14 to fold. At least, the equipment room 12, post 24, bridge members 28, and transverse bar 32 define a support structure to which the wash tub 14 is pivotalbly supported. Wash tub 14 is fastened to the round pivot bar 30 and spaced between the post 24 and equipment room 12. Wash tub 14 may be folded, that is rotated to the stored position (FIG. 2) or to an open position (FIG. 1) to wash the pet. Thus, the wash tub 14 is rotatable approximately ninety degrees from the stored position to the open position 16 and then similarly rotatable approximately 90 degrees from the open position to the stored position.

In the storage position the bottom of the wash tub 14 will face outward.

The bottom of the wash tub 14, and in this embodiment, the bottom of the back wall 36 of the wash tub 14 abuts the transverse bar 32 to both stop the rotation of the wash tub 14 at the open position 16 and to provide structural support to the wash tub 14 in the open position 16. The wash tub 14 has a height 48 relative to a floor 50 that allows a user to wash the pet with the most ergonomic comfort. That is, most users will not have to squat, kneel or excessively bend at the waste relative to washing the pet on the floor 50.

With additional reference to FIGS. 3 and 4, the equipment room 12 is an enclosure with a bottom 52, a top 54, surrounding sides 26, 56, front 58, and back. The equipment room 12 has a depth 60 from front 58 to back that defines the storage depth of the pet wash station 10 when the wash tub 14 is in the storage position (FIG. 4). When the wash tub 14 is in the open position 16, the maximum depth 62 of the pet wash station 10 is generally defined by the wash tub 14 (FIG. 3) and exceeds the storage depth of the pet wash station 10 defined by the depth 60 of the equipment room 12. More particularly, when the wash tub 14 is in the open position the pet wash tub 14 extend, outward beyond the front 58 of the equipment room 12. This arrangement allows the wash station 10 to have a smaller foot print above floor so when in the storage position as opposed to the open position this allows for the pet wash station 10 to be located within a bay of a car wash while preventing the wash station 10 from interfering with access of the bay of the a vehicle.

With reference to FIG. 1, the equipment room 12 includes vending control unit 22 with a user interface 64 located on the front 58 of the equipment room 12. The equipment room 12 has restricted access so as to protect the vending control unit 22 that accepts payment from in any convenient form (e.g., coins, paper, tokens, debit or credit cards, etc.) to activate its operational control functions.

The pet wash station 10 may be shipped as a single unit or it may be shipped and assembled on site. The equipment room 12 is configured to receive an electrical supply, air supply and a water supply. Once on site the foregoing connections are made as needed depending on the particular embodiment of the pet wash station 10.

The equipment room 12 includes means to receive water and selectively control its pressure and temperature for distribution to the pet wash tub 14. In a preferred embodiment, a flexible liquid hose 66 distributes the temperature and pressure controlled water from the equipment room 12 to the pet wash tub 14.

The equipment room 12 also includes means to mix the water supply and the wash solution to form a wash solution mix. The equipment room 12 further includes the means to distribute the wash solution mix to the pet wash tub 14. The same flexible liquid hose 66 that is used to distribute the temperature and pressure controlled water also distributes the wash solution mix to the pet wash tub 14. The flexible liquid hose 66, when not in use, may rest within a pocket 67 of the side wall 26 of the equipment room 12. The flexible liquid hose 66, on a free end thereof, may be connected to a pressurized wash-water supply unit in the equipment room 12. Further, a manually operable (e.g., trigger operated) spray head or nozzle 70 may be connected to the other free end 68 of the flexible liquid hose 66 for fine user flow control while washing the pet.

The equipment room 12 further includes the means to create or receive the drying air. The equipment room 12 is provided with the means to selectively control the temperature and pressure of the drying air. The drying air is then distributed from the equipment room 12 to the pet wash tub 14 through a flexible drying hose 72.

The vending control unit 22 controls the availability of the water, the wash solution mix, and the drying air in response to user selected input. In particular, in an arrangement for self-service wash facilities, the vending control unit accepts a wash-cycle selection made by the user, e.g., by selection of option(s) with one or more control buttons 74, and responsive thereto, controls the wash-water and air supply means in the equipment room 12. Thus, the vending control unit 22 controls the supply availability and length of time of the rinses, wash solution mix to the spray nozzle 70, and the control of the drying air to the flexible drying hose 72.

In other embodiments, though not illustrated, the vending control including the acceptance of payment to activate the pet wash operational control functions may be located external to the pet wash and or integrated with pre-existing controls for a self-service car wash. For example, often times in a self-service car wash vending controls are located on a wall of the car wash bay. Accordingly, the pet wash vending controls may be integrated with the self-service car wash bay vending controls such that in addition to vending control selections for a vehicle wash, vending controls would be available to select so as to enable the pet wash for washing a pet.

In yet other embodiments the water, the water wash solution mix, and the drying air may be provided directly from the pre-existing equipment within a self-service car wash bay. For example, the same hose supplying water to wash and rinse the vehicle may supply the water to wash and rinse the pet.

In still other embodiments, though not illustrated, equipment room 12 and pet wash tub 14 may be independent of one another, that is, not attached to one another for structural support. Such embodiments may provide for use in in a larger pet wash area with a separate folding tub 14 or even a fixed tub and a separate equipment room 12.

FIGS. 3 and 4 illustrate in greater detail the wash tub 14 of the embodiment shown in FIGS. 1 and 2. The front wall 34, back wall 36, and sidewalls 38, 40 may include a tapered profile that assists in enabling platform 20 to allow for the necessary grade for gravity drain 42. FIG. 4 shows with greater clarity the tapered profile of side wall 38 with the pet wash 10 in the stored position 18.

Figure 5:
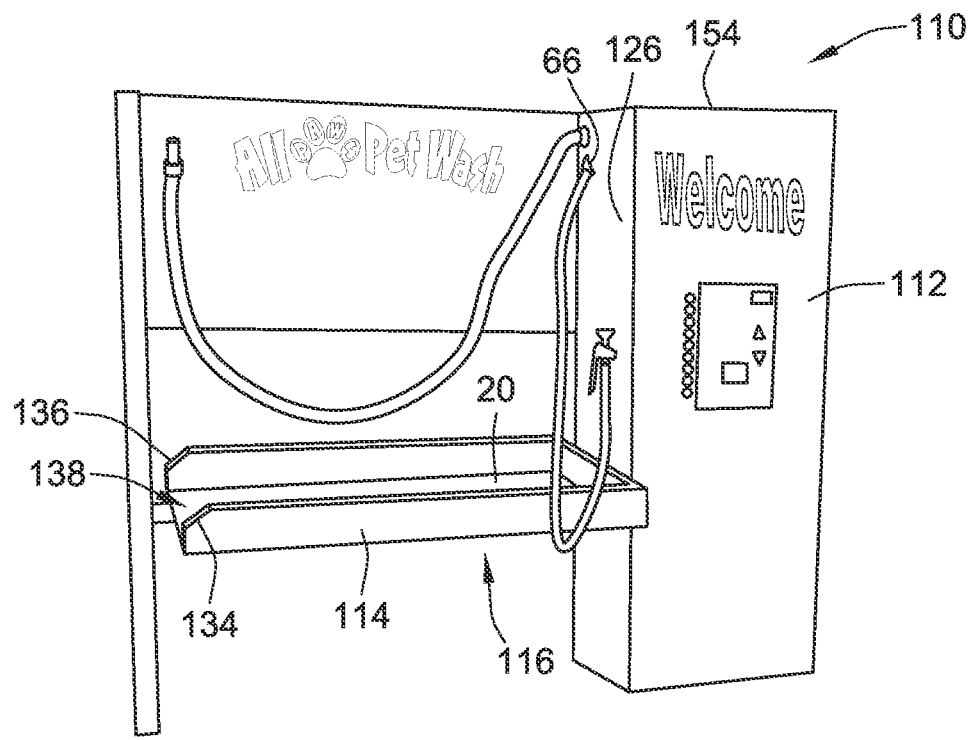
FIG. 5 is a perspective view of another embodiment of the present invention.
Figure 6:
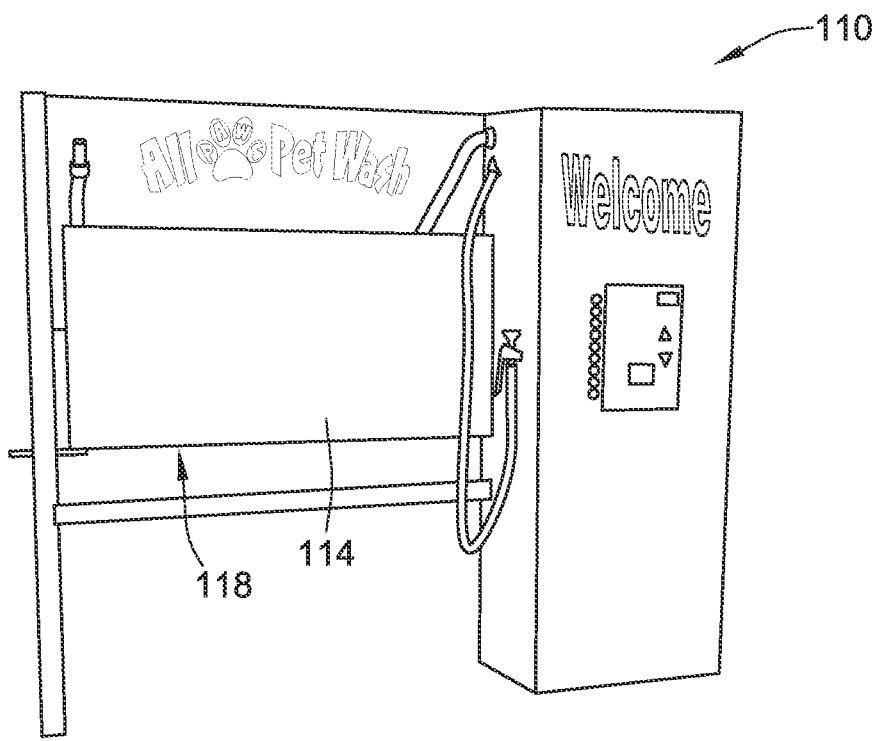
FIG. 6 is a perspective view of certain aspects of the pet wash station shown in FIG. 2.

FIGS. 5 and 6 illustrate an alternative embodiment of the pet wash. Pet wash 110 is similar to the previous embodiments heretofore described with respect to FIGS. 1-4 in most respects except for the wash tub 114. In this embodiment, a sidewall of the wash tub 114 is removed to provide an entrance 138 for the pet into the wash tub 114. Ends of the front wall 134 and back wall 136 are tapered. The removed side wall also provides another drain for the wash tub 114. Further, unlike the previous embodiments wherein the liquid hose in the stored position was located within the pocket of a sidewall 126 of equipment room 112, here liquid hose 66 protrudes from side wall 126 near the top 154 so as to position the hose above the pet wash 114 and the liquid hose 66 is stored on a hanger attached to sidewall 126.

In another embodiment, though not illustrated, pet wash tub 114 and equipment room 112 may be independent of one another, that is, not attached to one another for structural support. Such embodiments may provide for use in in a larger pet wash area with a separate wash tub 114 and a separate equipment room 112.

Figure 7:
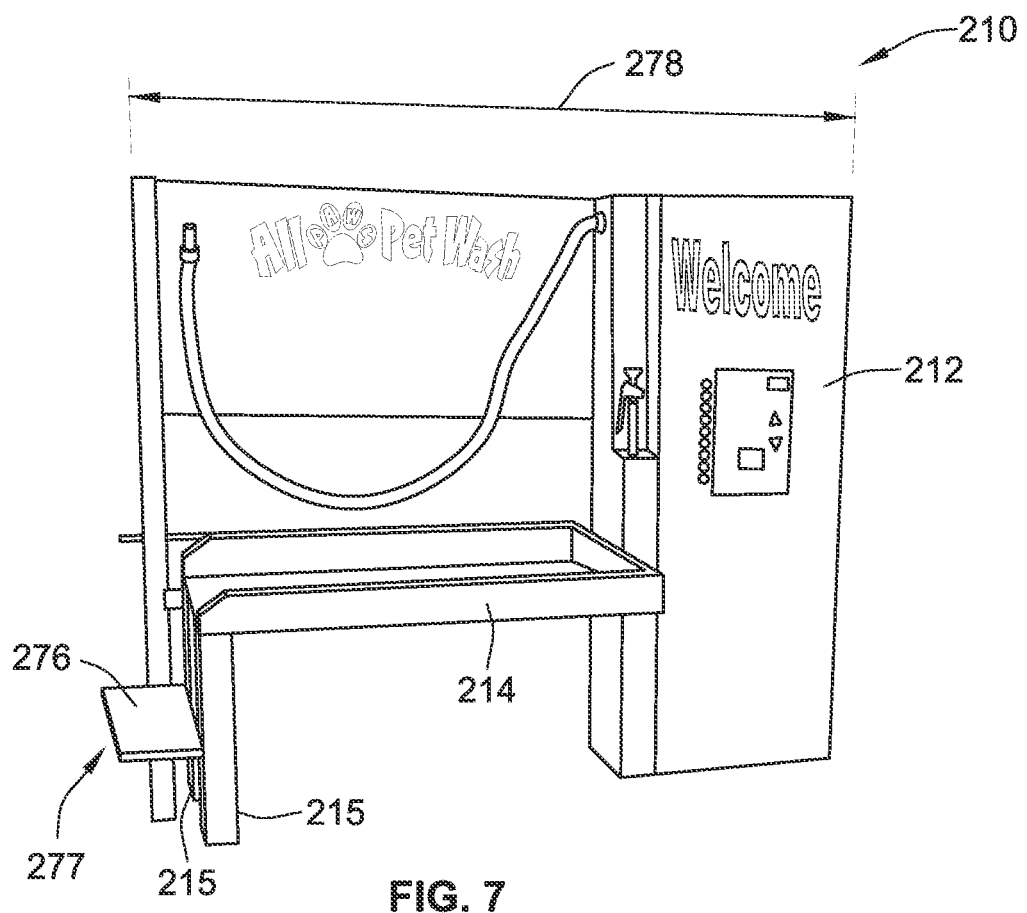
FIG. 7 is a perspective view of certain aspects of the pet wash station of FIG. 6.

FIG. 7 illustrates yet another embodiment of the pet wash. Here pet wash 210 comprises a step 276 to allow the pet to transition from the floor 250 to the step 276 and then into the wash tub 214 with little or no owner assistance. The step 276 in some embodiments may be foldable, that is, it can rotate between an open position 277 and a more compact closed position and thereby provide a step without significantly increasing the overall length 278 of the pet wash 210. Additionally, pet wash 214 includes legs 215, which provide both structural support to wash tube 214 and a mounting surface for step 276.

In another embodiment, though not illustrated, pet wash tub 214 and equipment room 212 may be independent of one another, that is, not attached to one another for structural support. Such embodiments may provide for use in in a larger pet wash area with a separate wash tub 214 and a separate equipment room 212.

Figure 8:
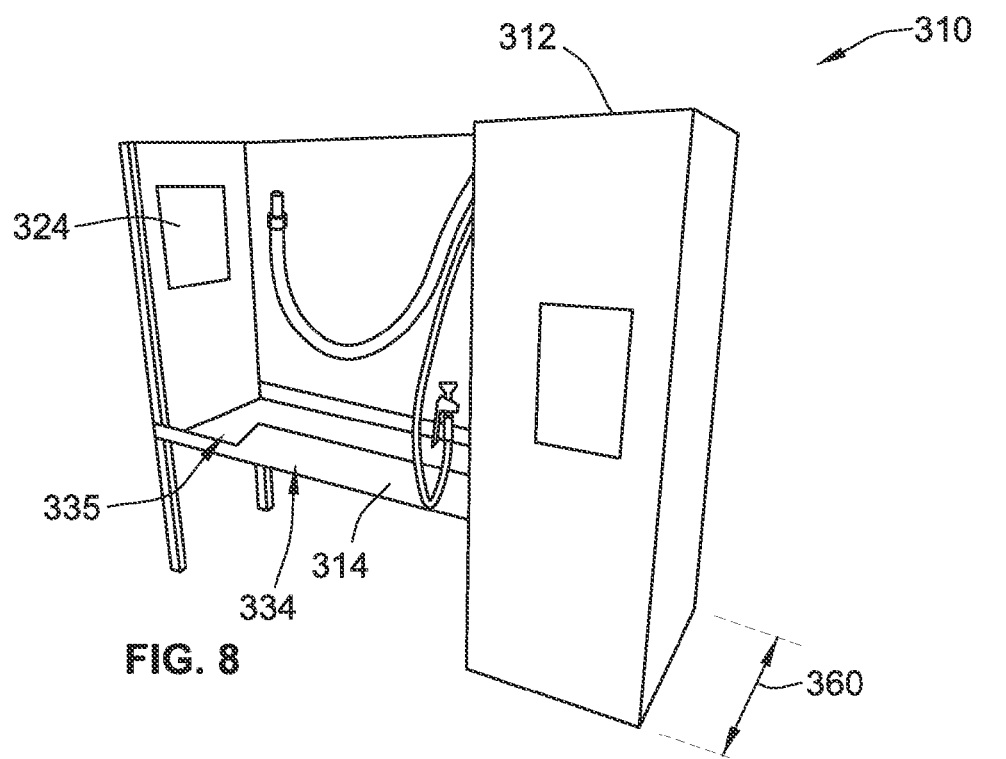
FIG. 8 is a perspective view of still another embodiment of the present invention.
Figure 9:
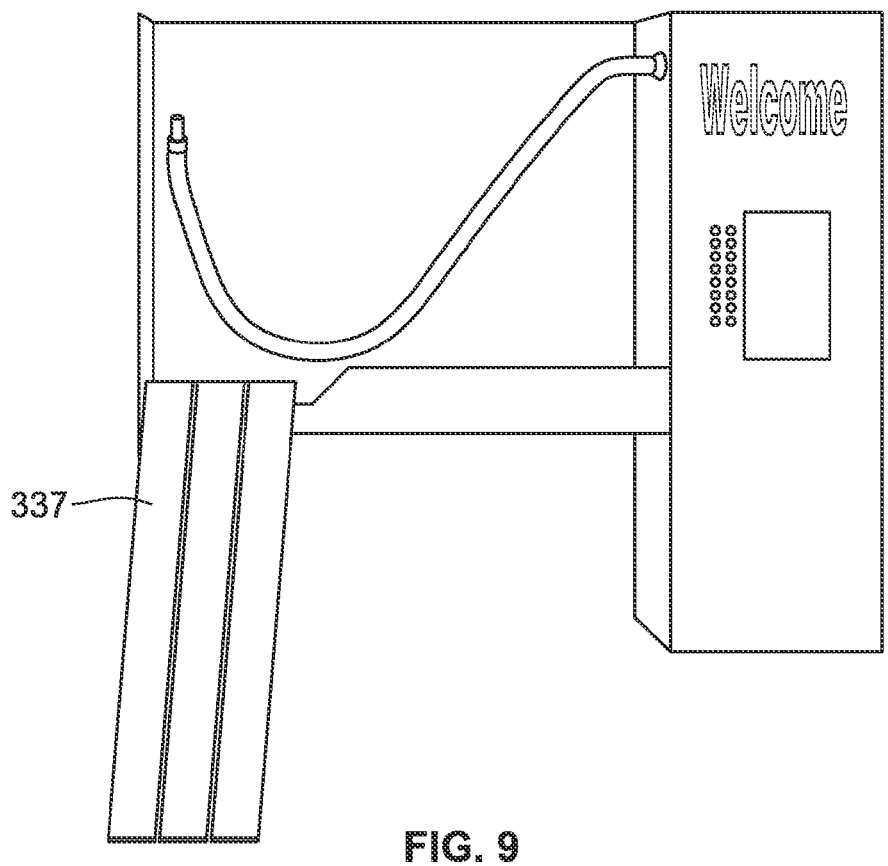
FIG. 9 is a perspective view of certain aspects of the pet wash station of FIG. 8.

FIGS. 8 and 9 illustrate still another embodiment of the pet wash 310. Here, the wash tub 314 is not foldable and the front wall 334 has a cutout 335 that permits a ramp 237 (FIG. 9) to be placed to allow the pet to move from the floor 350 into the wash tub 314. Additionally, unlike the other embodiments here additional structural support is provided to the wash tub 314 by a side panel 324. Because of the addition structural support, the overall depth of the pet wash 310 does not exceed the depth 360 of the equipment room 312 and thus, like the storage depth of the previous embodiments, here the storage depth 360 of the pet wash 310 is still defined by the depth 360 of the equipment room 312 even though the wash tub 314 is permanently fixed in the open position.

In another embodiment, though not illustrated, pet wash tub 314 and equipment room 312 may be independent of one another, that is, not attached to one another for structural support. Such embodiments may provide for use in in a larger pet wash area with a separate wash tub 314 and a separate equipment room 312.

In all the embodiments heretofore described construction of the pet wash may be of any number of materials, for example, aluminum, stainless steel, or any suitable metal or combination of materials. The foregoing examples are not intended to limit the materials that may be used in the pet wash construction.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A pet washing facility comprising:
   a self-service car wash including a bay for washing a car;
   a self-service pet wash station located within the bay of the self-service car wash, the pet wash includes:
      a foldable wash tub that folds from an open position to storage position about an axis; and
      a support structure to which the foldable wash tub is mounted for rotation between the open position and the storage position.

2. The pet washing facility of claim 1, wherein the self-service pet wash station has a reduced foot print above a floor of the bay of the self-service car wash when the foldable wash tub is in the storage position.

3. The pet washing facility of claim 1, wherein the wash tub defines a front wall, a rear wall and a platform extending between the front wall and the rear wall, the wash tub mounted to the support structure proximate the rear wall.

4. The pet washing facility of claim 3, wherein in the storage position, the front wall is generally vertically above the rear wall and in the open position the front wall is generally horizontally spaced from the rear wall.

5. The pet washing facility of claim 4, wherein the support structure includes a stop member that limits pivoting motion of the wash tub about the axis from the storage position to the open position.

6. The pet washing facility of claim 1, further comprising a control unit for selectively controlling actuation of supplying the wash tub with rinse water, wash solution mix and dry air to wash a pet in the wash tub.

7. The pet washing facility claim 6, wherein the control unit forms part of the support structure.

8. The pet washing facility of claim 7, wherein the support structure defines a first depth perpendicular to the axis and generally parallel to a floor of the bay, the wash tub defines a second depth when in the open position that is perpendicular to the axis and generally parallel to the floor of the bay and the wash tub defines a third depth when in the storage position that is perpendicular to the axis and generally parallel to the floor of the bay, the first depth being greater than the third depth and less than the second depth.

9. The pet washing facility of claim 6, wherein the control unit is integrated with self-service car wash bay vending controls.

10. The pet washing facility of claim 1, wherein, the wash tub defines a second depth when in the open position that is perpendicular to the axis and generally parallel to the floor of the bay and the wash tub defines a third depth when in the storage position that is perpendicular to the axis and generally parallel to the floor of the bay, the second depth being greater than the third depth.

11. The pet washing facility of claim 1, further comprising an equipment room that has a fourth depth that is perpendicular to the axis and generally parallel to a floor of the bay, the fourth depth being the maximum depth of the pet wash station when the wash tub is in the storage position.

12. The pet washing facility of claim 11, wherein the equipment room forms part of the support structure.

13. The pet washing facility of claim 11, wherein the equipment room of claim 11, wherein the equipment room is independent of the support structure.

14. The pet washing facility of claim 11, wherein the equipment room includes at least a supply of water and wash solution for washing a pet.

15. The pet washing facility of claim 11, further comprising a control unit for selectively controlling actuation of supplying the wash tub with rinse water, wash solution mix and dry air to wash a pet in the wash tub.

16. The pet washing facility of claim 15, wherein the control unit forms part of front panel of the equipment room.

17. The pet washing facility of claim 1, further comprising a spray nozzle operably coupled to a source of washing liquid.

18. A self-service pet wash station, comprising: a foldable wash tub that folds from an open position to storage position; a control unit for controlling at least the actuation of a supply of water for use in washing a pet on the foldable wash tub; and a support structure to which the foldable wash tub is mounted for rotation about an axis between the open position and the storage position, the control unit forming part of the support structure; wherein the self-service pet wash station has a reduced dimension in a direction extending generally perpendicular to the axis and to gravity when in the storage position, wherein the support structure includes an equipment room, the depth of the equipment room defining the depth of the pet wash station when the foldable wash tub is in the storage position.

19. The self-service pet wash station of claim 18, wherein the support structure includes a stop member that limits pivoting motion of the wash tub about the axis from the storage position to the open position.

20. The self-service pet wash station of claim 18, wherein:
the wash tub defines a front wall, a rear wall and a platform extending between the front wall and the rear wall, the wash tub mounted to the support structure proximate the rear wall;
in the storage position, the front wall is generally vertically above the rear wall and in the open position the front wall is generally horizontally spaced from the rear wall; and
the support structure includes a stop member that limits pivoting motion of the wash tub about the axis from the storage position to the open position.

21. A self-service pet wash station, comprising:
an equipment room;
a foldable wash tub foldable between an open configuration and a storage configuration;
a control unit to actuate supplying the wash tub with rinse water, wash solution mix and dry air to wash a pet in the wash tub; and
wherein the equipment room further includes a depth that defines a maximum depth of the pet wash station when in a storage configuration.

* * * * *